United States Patent
Matsumoto et al.

[11] Patent Number: 5,808,972
[45] Date of Patent: Sep. 15, 1998

[54] STABILIZED OVERWRITEABLE OPTICAL RECORDING METHOD USING LASER BEAM INTENSITY SETTINGS

[75] Inventors: Hiroyuki Matsumoto, Tokyo; Koichiro Ishii, Zushi; Kazutomo Miyata, Kashiwa, all of Japan

[73] Assignee: Nikon Corporation, Tokyo, Japan

[21] Appl. No.: 744,860

[22] Filed: Nov. 5, 1996

[30] Foreign Application Priority Data

Dec. 28, 1995 [JP] Japan ................................. 7-343207
Dec. 28, 1995 [JP] Japan ................................. 7-343483

[51] Int. Cl.⁶ .................................................. G11B 11/00
[52] U.S. Cl. ........................................... 369/13; 369/116
[58] Field of Search ............................. 369/13, 116, 54, 369/275.2, 14, 48, 58

[56] References Cited

U.S. PATENT DOCUMENTS

| | | | |
|---|---|---|---|
| 5,185,733 | 2/1993 | Finkelstein et al. | 369/54 |
| 5,239,524 | 8/1993 | Sato et al. | 369/13 |
| 5,249,172 | 9/1993 | Hagihara et al. | 369/116 |
| 5,410,527 | 4/1995 | Ashinuma | 369/116 |
| 5,475,666 | 12/1995 | Ito et al. | 369/54 |
| 5,485,433 | 1/1996 | Satomura et al. | 369/13 |
| 5,629,913 | 5/1997 | Kaku et al. | 369/54 |

*Primary Examiner*—Tan Dinh

[57] ABSTRACT

A stabilized overwriteable optical recording method, wherein overwriting is performed sufficiently because erasure does not become poor with a low level laser beam intensity $P_L$ set too low. The method includes setting the recording laser beam intensity in order to perform recording on an overwriteable optical recording medium, finding the lower limit value of laser beam intensity at which a high temperature process occurs, and, based on this lower limit value of laser beam intensity, provisionally setting a high level laser beam intensity. After magnetization reversal marks have been formed in a test recording region by this lower limit value, the test recording region is played back. Then, after the test recording region has been illuminated with a laser beam, performing erasure of the magnetization reversal marks. Then the test recording region is played back, and by making a comparison of the playback signals before and after erasure was performed, the optimum low level laser beam intensity is set.

9 Claims, 2 Drawing Sheets

STABILIZED OVERWRITEABLE OPTICAL RECORDING METHOD USING LASER BEAM INTENSITY SETTINGS

CROSS REFERENCE TO RELATED APPLICATIONS

This application is based upon and claims priority from Japanese Patent Application Nos. 07-343207 and 07-343483 both filed Dec. 28, 1995, the contents of both being incorporated herein by reference.

BACKGROUND OF THE INVENTION

1. Field of the Invention

The present invention relates to optical recording methods. More particularly, the present invention relates to recording data on overwriteable magnetooptical disks by correctly setting a laser beam intensity.

2. Description of the Related Art

In recent years, there has been a diffusion of optical recording and replay methods, and of the optical recording devices, replay devices and recording media used therein, satisfying the requirements for high density, large capacity, and high access speeds, together with high recording and replay speeds. Many kinds of principles—opening holes by heat, phase change, magnetooptical and the like—have been used in optical recording and replay methods. Among these, the phase change or magnetooptical methods by which, after data has been recorded, the data can be erased so that recording of new data is again possible, are being widely used for external memories of computers and for consumer-use audio equipment.

Until lately, in methods of optical recording and playback, once data had been recorded, it was not possible to overwrite the data record with new data without performing an erasing process. However, just by modulating the intensity of an illuminating light beam in compliance with the digital data to be recorded, an optical recording method in which overwriting is possible, and an overwriteable recording medium used therein, and a recording device with which overwriting is possible by the use of this method, have been proposed.

This is described as an example of magnetooptical recording. Moreover, patents have been applied for in several countries for this method, and among them, issued U.S. Pat. No. 5,239,524 and related Japanese Laid-Open Patent Publication 62-175948 and German Patent Application 3,619,618-A1. This invention is cited hereinbelow as the "basic invention".

The storage layer of this overwriteable magnetooptical recording medium which is used in the magnetooptical recording and playback method includes multiple layers of magnetic layers having perpendicular magnetic anisotropy (perpendicular magnetic layer or layers). These magnetic layers comprise, for example, TbFe, TbFeCo, GdFe, GdFeCo, DyFe, DyFeCo and the like.

The medium used in the basic invention is "An overwriteable multi-layer magnetooptical recording medium, in which basically layers functioning as recording and playback layers (termed below "memory layers" or "M-layers"), consisting of perpendicularly magnetizable magnetic thin film(s), and recording auxiliary layer(s) (termed hereinbelow "recording layers" or "W-layers") consisting of the same perpendicularly magnetizable magnetic thin films, both layers are exchange-coupled, and also, at room temperature, only the magnetization of W-layers can be oriented in a predetermined direction without changing the direction of the magnetization of the M-layer." The W-layers, in comparison with the M-layers, have a low coercivity Hc at room temperature and a high Curie point Tc.

The data is then recorded in the M-layer, or as the case may be, also in the W-layer, as marks having a direction of magnetization perpendicular to the substrate ("A direction") and as marks having magnetization in a direction opposite to this ("anti-A direction").

In this medium, the W-layer can arrange its direction of magnetization in one direction by magnetic field means (for example, an initial auxiliary magnetic field, $H_{ini}$) without changing the direction of the magnetization of the M-layer. Furthermore, once the direction of magnetization of the W-layer has been arranged in one direction, it does not reverse even though it receives an exchange coupling force from the M-layer, and on the contrary, the direction of magnetization of the M-layer does not reverse even though it receives exchange coupling forces from the W-layer, which was arranged in one direction.

In the recording method of the basic invention, only the direction of magnetization of the W-layer of the recording medium arranged in one direction by a magnetic field just before recording. In addition to this, a laser beam, pulse modulated according to digitized data, illuminates the medium. The intensity of the laser beam is controlled to two values, a high level $P_H$ and a low level $P_L$, corresponding to a high level and a low level of the pulses. The low level is higher than the replay level $P_R$ which illuminates the medium during replay. As is already known, even when not recording, for example in order to access a predetermined recording place in the medium, the laser is generally controlled at a "very low level". This very low level, also, is the same as, or close to, the replay level $P_R$.

In the case that a low level laser beam illuminates the medium, at the temperature which the medium reaches, the direction of magnetization of the W-layer does not change. However, the direction of magnetization of the M-layer becomes the direction of a state in which no magnetic walls exist between the M-layer and the W-layer. This is called a low temperature process. The temperature region according to this process is called the low temperature process temperature $T_L$.

On the other hand, in the case that a high level laser beam illuminates the medium, at the temperature which the medium reaches, the direction of magnetization of the W-layer follows the direction of the recording magnetic field. The direction of magnetization of the M-layer becomes the direction of a state in which no magnetic walls exist between the M-layer and the W-layer. This is called a high temperature process. The temperature region according to this process is called the high temperature process temperature $T_H$.

After illumination with the laser beam, by applying the magnetic field, the magnetization of the W-layer which followed the direction of the recording magnetic field due to the high level laser beam illumination, again follows the direction of the magnetic field means. Accordingly, if the direction of magnetization of the magnetic field means and the direction of the recording magnetic field are reversed, in the M-layer, which already has data recorded thereon, new recording (namely, overwriting) is possible. This is the principle of optically modulated overwrite magnetooptical recording.

The method described above forms a record mark by illumination with a high level laser beam, and erases the record mark by illumination with a low level laser beam, and can be said to overwrite a new record over an old record.

However, in the case of performing actual recording on an optical disk, in order to optimize the shape of the record marks, it is necessary to finely adjust the laser beam intensity in relation to the recording sensitivity of the disk to be recorded on, the optimum recording temperature, and the environmental temperature. At present, in presently marketed magnetooptical disk recording devices, a fine adjustment of the laser beam intensity is performed by performing a test recording before the actual recording of data.

Nevertheless, even when performing a fine adjustment of the laser beam intensity by performing a test recording, there were cases which were judged to be erroneous recording in overwrite optical recording. In such cases, the cause of this was generally that the record marks from the previous time were not sufficiently erased by the low level $P_L$ laser beam intensity.

In optical intensity modulated overwrite recording, the failure to erase old marks is because the low level laser beam intensity $P_L$ is improperly set. $P_L$ is an important parameter which is involved in not only recording, but also erasure. Even if the recording laser beam intensity was found by performing a test recording, overwriting was insufficiently performed, because erasure became poor when $P_L$ was set too low.

SUMMARY OF THE INVENTION

Accordingly, it is an object of the present invention to provide an optical recording method by which stabilized overwrite recording may be performed, solving the above problems.

Objects of the present invention are achieved by a method of optical recording in which a recording laser beam intensity is set in order to perform recording on an overwriteable optical recording medium, comprises the steps of finding a lower limit value of the laser beam intensity at which a high temperature process occurs, provisionally setting a high level laser beam intensity using the lower limit value of the laser beam intensity, forming magnetization reversal marks in a test recording region using the provisional high level laser beam intensity, after forming the magnetization reversal marks, playing back the test recording region; and illuminating the test recording region with a laser beam and erasing the magnetization reversal marks; then playing back the test recording region, and comparing the playback signals before and after the erasing step, thereby setting an optimum low level laser beam intensity.

Other objects of the present invention are achieved by a method of optical recording, comprising the steps of performing recording by causing a high level laser beam intensity to change in every sector or every plural sectors of an optical recording medium; and setting the optimum high level laser beam intensity.

Still further objects of the present invention are achieved by a method of optical recording of an overwriteable optical recording medium, comprising the steps of setting a laser beam intensity in order to perform recording on the overwriteable optical recording medium, finding a lower limit of laser beam intensity at which a high temperature process occurs, and performing calculations using the lower limit of laser beam intensity to find an optimum low level laser beam intensity.

Yet further objects of the present invention are achieved by a method of optical recording of an overwriteable optical recording medium, comprising the steps of setting a recording laser beam intensity in order to perform recording on the overwriteable optical recording medium, finding a lower limit of laser beam intensity at which a high temperature process occurs, and performing calculations using the lower limit of laser beam intensity, thereby finding an optimum high level and low level laser beam intensity.

Even further objects of the present invention are achieved by a method of optical recording of an overwriteable optical recording medium, comprising the steps of setting a recording laser beam intensity in order to perform recording on the overwriteable optical recording medium, finding a lower limit of laser beam intensity at which a high temperature process occurs, performing calculations using the lower limit of laser beam intensity, thereby finding a low level laser beam intensity, finding an optimum high level laser beam intensity by fixing the low level intensity, performing recording, and causing a high level laser beam intensity to change.

Additional objects and advantages of the invention will be set forth in part in the description which follows and, in part, will be obvious from the description, or may be learned by practice of the invention.

BRIEF DESCRIPTION OF THE DRAWINGS

Other objects, features, and characteristics of the present invention will be better understood by a study of the following detailed description, the appended claims, and the figures. In the drawings:

DETAILED DESCRIPTION OF THE PREFERRED EMBODIMENTS

Figure 1:
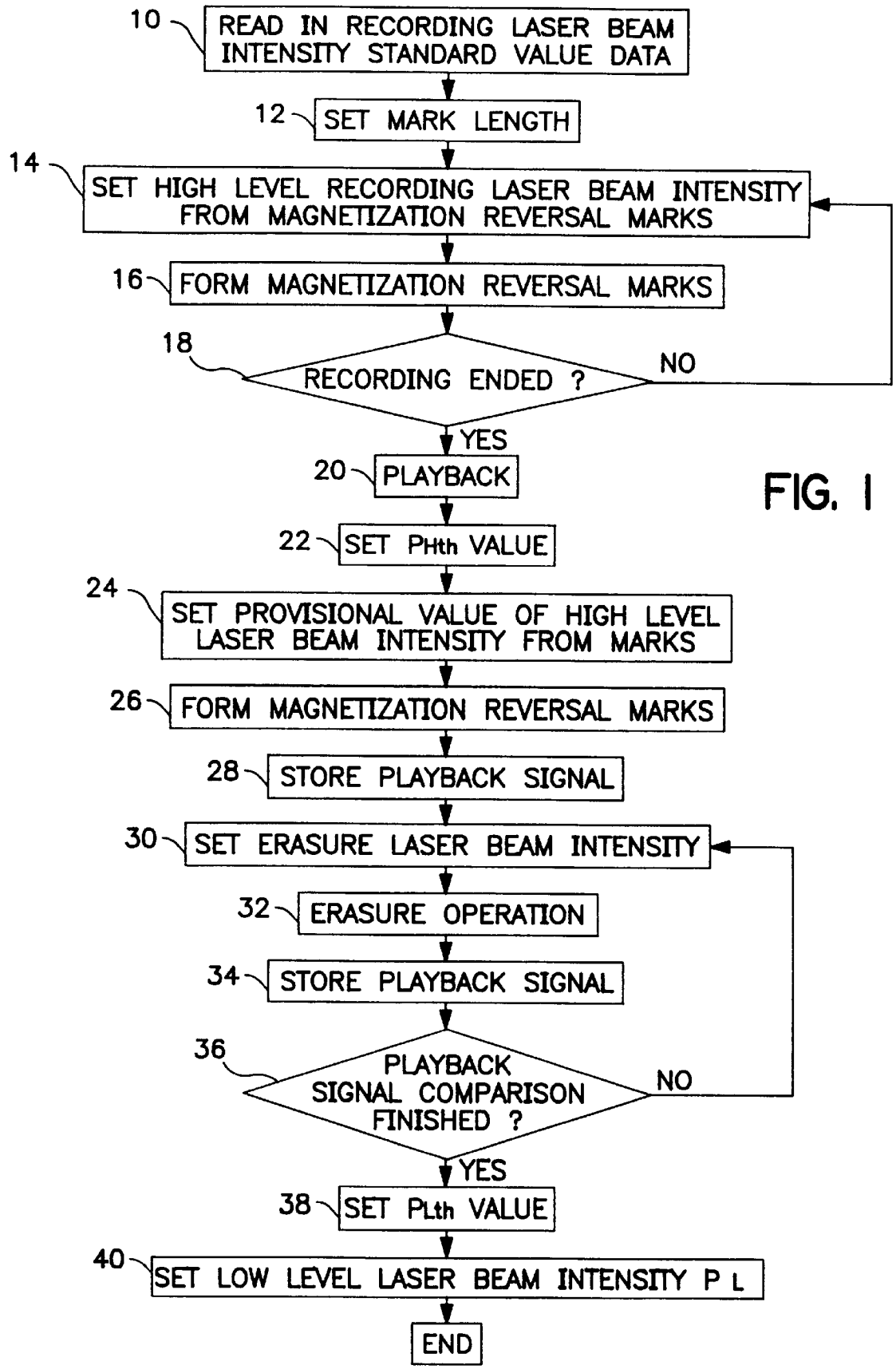
FIG. 1 is a flow chart which illustrates an optical recording method according to a first embodiment of the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

A description will next be given of an optical recording method according to the first embodiment of the present invention, with reference to FIG. 1.

A magnetooptical disk is provided which can be overwritten by optical modulation. This magnetooptical disk is divided into plural zones whose recording frequencies differ. In a predetermined region, standard data relating to recording beam intensity for each recording zone is recorded. Setting this magnetooptical disk in a record and replay device, data relating to recording laser beam intensity is read in from the predetermined region in step 10.

Next, with respect to a test recording region, while changing the high level laser beam intensity $P_H$ in each of its sectors in step 14, recording is performed and magnetization reversal marks are formed in step 16. During this recording process, in order to make the magnetization reversal marks easy to detect, they are preferably made long in step 12. Once the recording has ended in step 18, the regions in which recording was performed are played back in step 20, and the lower limit value $P_{Hth}$ of the laser beam intensity at which marks have been recorded is found in step 22. Here, because the playback signal level is very low for marks recorded at a laser beam intensity close to $P_{Hth}$, and their detection is therefore difficult, the lower limit $P_{Hth}$ is actually taken as some degree of level of playback signal above that at which recording of marks has been performed.

Then by calculations such as multiplying the found lower limit value $P_{Hth}$ by a coefficient, the high laser beam intensity is provisionally set in step 24. In the case of multiplying by a coefficient, 100–200% is suitable.

Next, in the test record regions of plural sectors, recording is performed at the provisionally set laser beam intensity. Once recording has ended and after magnetization reversal marks are formed in step 26, this region is played back, and this playback signal is stored in step 28. Next, the laser beam intensity is set for erasure level $P_L$ for the recorded regions in step 30 in a state in which DC lighting is caused, and after an erasing action has occurred in step 32 while changing the beam intensity every sector or every plural sectors, the test sector region is played back and stored in step 34, the playback signals before and after the erasing action are compared and once the comparison is completed in step 36, whether or not the magnetization reversal marks have been erased is evaluated.

Various methods are applied for the evaluation. For example, there is the method by which signals are visually compared and evaluated. Moreover, an erasure factor may be set beforehand. The erasure factor is found from the ratio of the playback signal intensity before and after performing the erasure action, and there is the method of evaluating whether or not the erasure factor has fallen below the predetermined value. In this case, this predetermined value is desirably about 0.01–0.5. Proceeding in such a manner, the lower limit value $P_{Lth}$ is found in step 38 of the laser beam intensity at which the magnetization reversal marks are erased. The laser beam intensity $P_L$ is then set in step 40, based on $P_{Lth}$. The low level laser beam intensity $P_L$ may be set using both $P_{Hth}$ and $P_{Lth}$. For example, setting can be according to the expression $P_L = \alpha^* P_{Hth} + \beta^* P_{Lth}$, and the like.

The optimum $P_H$ may next be found, after $P_L$ has been set, by performing another test recording. Namely, the optimum $P_H$ is one which is found by fixing the low level laser beam intensity $P_L$ at the value that has been set, and by forming marks while changing the high level laser beam intensity $P_H$ every sector or every plural sectors.

Several methods are considered for deciding whether or not the value is the optimum $P_H$. For example, after recording a specified pattern in a test recording, the recording is played back, and the recorded pattern and the played back pattern are compared on respective channels. According to the displacement of the high level laser beam intensity from the optimum value, if the recording is not being accurately performed, or else, due to marks still remaining which were recorded before overwrite recording, the played back pattern differs from the recorded pattern, error increases. Consequently, the optimum high level laser beam intensity is set close to the middle of the laser beam intensity region where practically no error is detected.

Moreover, as another method, fixing the low level laser beam intensity $P_L$, and causing the high level laser beam intensity $P_H$ to change every sector or every plural sectors, a pattern is recorded which comprises alternating repetition of short marks and repetition of long marks, and when this is played back, the high laser beam intensity is found such that the amount of offset is 0 between the centers of the playback signal of each repetition of marks. This is taken as the optimum value.

In the above manner, by various methods, the combination of the high level laser beam intensity $P_H$ and the low level laser beam intensity $P_L$ is set.

In accordance with the embodiment of the present invention as described hereinabove, in the case of recording on an overwriteable optical disk, because the laser beam intensity can be optimally set, there are no problems of overwriting not being performed sufficiently because erasure becomes poor with $P_L$ set too low, and stabilized overwrite recording can be attained.

Figure 2:
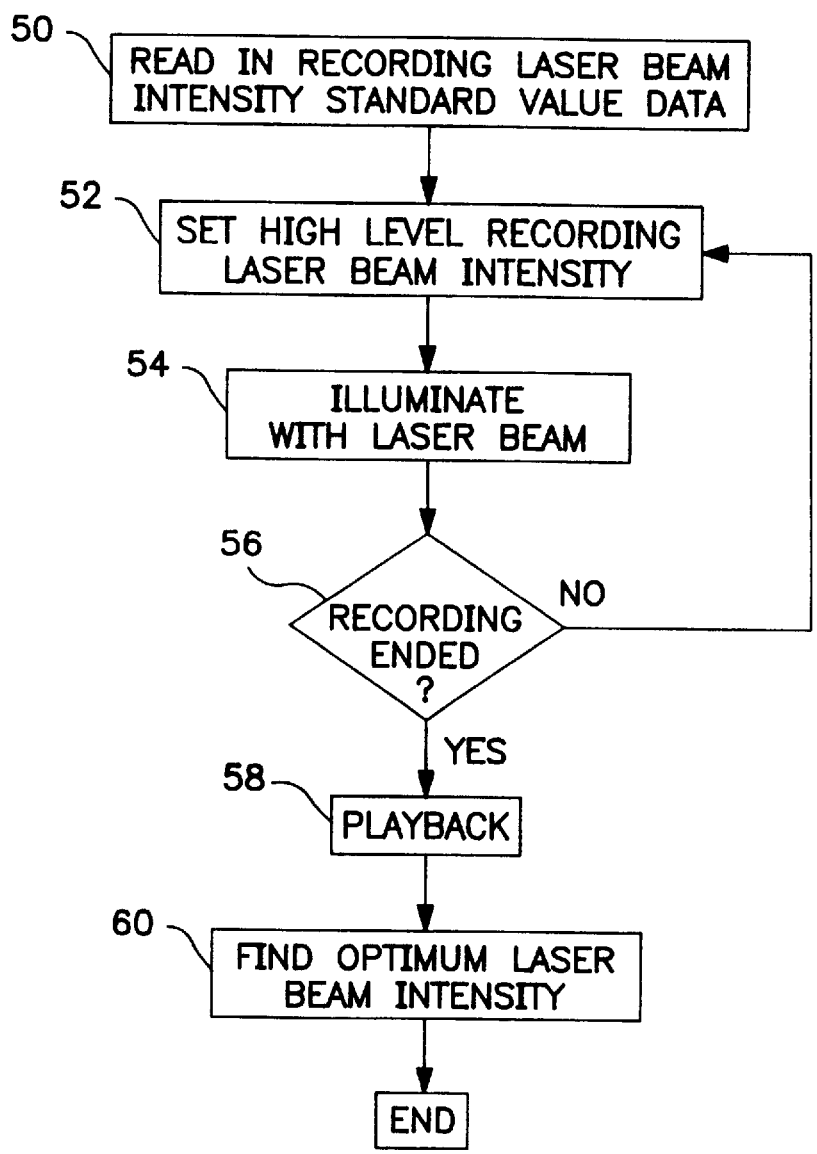
FIG. 2 is a flow chart illustrating an optical recording method according to a second embodiment of the present invention.

An optical recording method according to the second embodiment of the present invention will now be described with reference to FIG. 2. FIG. 2 illustrates a method wherein a magnetooptical disk is provided which can be overwritten by optical modulation. This magnetooptical disk is divided into a plurality of zones whose recording frequencies differ. In a predetermined region, standard data relating to recording beam intensity for each recording zone is recorded.

Setting this magnetooptical disk in a record and replay device, data relating to recording laser beam intensity is read in from the predetermined region in step 50.

Next, with respect to the disk recording region, recording is performed while changing the laser beam intensity $P_H$ of the high level for each of its sectors in step 52, and magnetic reversal marks are formed by illuminating the magnetooptical disk with the laser beam in step 54. This is in order to find the lower limit value of the laser beam intensity at which recording begins to be performed with a high temperature process occurring. During this, long marks are preferably recorded which are easy to detect during playback. Once the recording has ended in step 56, the region where recording was performed is played back in step 58, and the lower limit of the laser beam intensity is found at which marks were recorded. However, the playback signal is very low during the playback of a mark which was recorded at close to the lower limit value, and because its detection is difficult, what is actually taken as the lower limit is the laser beam intensity at which a mark was recorded whose playback signal was detected above some degree of level.

The laser beam intensity $P_L$ of the low level is then found by a calculation based on the lower limit value which was found. The simplest method, paying attention to a small scatter of the thermal diffusion coefficient between disks, is the method of finding $P_L$ by multiplying, by a predetermined coefficient, the lower limit which has been found. Moreover, the high level of laser beam intensity $P_H$ is also found by multiplying, by a predetermined coefficient, the lower limit value which has been found.

Moreover, after $P_L$ has been found, a test recording is performed with $P_L$ fixed and changing the high level of laser beam intensity, and the optimum high level laser beam intensity $P_H$ may be found from this playback signal in step 60.

In accordance with the optical recording method of the second embodiment of the present invention as described hereinabove, in the case of recording on an overwriteable optical disk, because the recording laser beam intensity can be appropriately set, overwriting is performed sufficiently because erasure does not become poor due to $P_L$ being set too low, and stabilized overwriting can be attained.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of optical recording in which a recording laser beam intensity is set in order to perform recording on an overwriteable optical recording medium, comprising the steps of:

finding a lower limit value of the laser beam intensity at which a high temperature process occurs;

provisionally setting a high level laser beam intensity using the lower limit value of the laser beam intensity;

forming magnetization reversal marks in a test recording region to store data in the test recording region using the provisional high level laser beam intensity;

after forming the magnetization reversal marks, playing back the data from the test recording region;

illuminating the test recording region with a laser beam and thereby erasing the magnetization reversal marks; and playing back the data from the test recording region, and comparing the playback signals before and after the erasing step, thereby setting an optimum low level laser beam intensity based on finding a laser beam intensity at which the magnetization reversal marks are erased.

2. A method of optical recording of an overwriteable optical recording medium according to claim 1, wherein the comparing step includes finding an erasure factor.

3. A method of optical recording of an overwriteable optical recording medium according to claim 1, further comprising the step of changing the laser beam intensity during erasing of the magnetization reversal marks one of every sector and every plural sectors of the optical recording medium.

4. A method of optical recording of an overwriteable optical recording medium according to claim 2, wherein the finding step includes selecting a value from the range of 0.01–0.5 as a predetermined value of the erasure factor, and defining the lower limit value of the erasure laser beam intensity as the value by which said erasure factor is obtained, and the optimum low level laser beam intensity is set, based on said lower limit value of the erasure laser beam intensity.

5. A method of optical recording of an overwriteable optical recording medium according to claim 4, wherein the setting step includes setting the optimum low level laser beam intensity based on a lower limit value $P_{Hth}$ and a lower limit value $P_{Lth}$.

6. A method of optical recording of an overwriteable optical recording medium according to claim 1, wherein the step of forming the magnetization reversal marks includes forming the magnetization reversal marks as marks longer than shortest marks recorded in the test recording region.

7. A method of optical recording of an overwriteable optical recording medium according to claim 1, further comprising the step of using a magnetooptical disk, which has plural mutually exchange coupled magnetic layers, as the overwriteable optical recording medium.

8. A method of optical recording of an overwriteable magneto-optical recording medium according to claim 1, further comprising the steps of:

after obtaining the optimum low level laser beam intensity, performing recording by using the obtained optimum low level laser beam and a high level laser beam intensity which changes in one of every sector and every plural sectors of the optical recording medium; and setting an optimum high level laser beam intensity.

9. A method of optical recording in which a recording laser beam intensity is set in order to perform recording on an overwriteable optical recording medium, comprising the steps of:

finding a lower limit value of the laser beam intensity at which a high temperature process occurs;

provisionally setting a high level laser beam intensity using the lower limit value of the laser beam intensity; and forming magnetization reversal marks in a test recording region to store data in the test recording region using the provisional high level laser beam intensity.

* * * * *

UNITED STATES PATENT AND TRADEMARK OFFICE
CERTIFICATE OF CORRECTION

PATENT NO. : 5,808,972
DATED : September 15, 1998
INVENTOR(S) : Hiroyuki Matsumoto, et al.

It is certified that error appears in the above-identified patent and that said Letters Patent is hereby corrected as shown below:

On the Title page, item [56] References Cited, Foreign Patent Documents, add --0 430 649 A2 6/1991 European Patent Office; and 0 446 892 A2 9/1991 European Patent Office--.

Signed and Sealed this

Ninth Day of March, 1999

*Attest:*

Q. TODD DICKINSON

*Attesting Officer*      *Acting Commissioner of Patents and Trademarks*